United States Patent [19]

Mattson et al.

[11] Patent Number: 5,265,098
[45] Date of Patent: Nov. 23, 1993

[54] METHOD AND MEANS FOR MANAGING DASD ARRAY ACCESSES WHEN OPERATING IN DEGRADED MODE

[75] Inventors: Richard L. Mattson; Spencer Ng, both of San Jose, Calif.

[73] Assignee: International Business Machines Corporation, Armonk, N.Y.

[21] Appl. No.: 562,188

[22] Filed: Aug. 3, 1990

[51] Int. Cl.$^5$ .............................................. G06F 11/00
[52] U.S. Cl. .................................. 371/11.1; 395/725; 395/425; 371/401; 371/10.2
[58] Field of Search ............... 371/11.1, 7, 40.1, 37.1, 371/40.4, 38.1, 51.1, 10.1, 10.2, 2.2; 395/725, 425; 364/200

[56] References Cited

U.S. PATENT DOCUMENTS

| | | | |
|---|---|---|---|
| 4,092,732 | 5/1978 | Ouchi | 364/900 |
| 4,761,785 | 8/1988 | Clark et al. | 371/51 |
| 4,914,656 | 4/1990 | Dunphy, Jr. et al. | 371/10.2 |
| 4,989,205 | 1/1991 | Dunphy, Jr. et al. | 371/10.1 |
| 5,124,987 | 6/1992 | Milligan et al. | 371/10.1 |
| 5,134,619 | 7/1992 | Henson et al. | 371/40.1 |

OTHER PUBLICATIONS

Brady et al., USSN 07/528,999, filed May 24, 1990, "Method and Means for Accessing DASD Arrays with Tuned Data Transfer Rate and Concurrency".

Patterson et al., "A Case of Redundant Arrays of Inexpensive Disks (RAID) ACM SIGMOD" conference, Chicago, Ill., Jun. 1-3, 1988.

Raghavarao, "Construction and Combinatioial Problems in the Design of Experiments", copyright Dover publication 1971,1988.

Berman and Fryer, "Introduction to Combinatories", copyright Academic Press Inc. 1972.

Primary Examiner—Robert W. Beausoliel, Jr.
Assistant Examiner—Phung M. Chung
Attorney, Agent, or Firm—R. Bruce Brodie

[57] ABSTRACT

A method and apparatus are disclosed which minimize the additional read and write loading for each remaining DASD in a DASD array occasioned by a single point of failure where subsets of DASDs may accessed asynchronously (RAID 4 or RAID 5). In this method, parity groups are written across the array in a pattern forming a balanced incomplete block design or the equivalent. In the event of failure of a DASD in the array, then any additional loading resulting from the failure is uniformly spread among the remaining DASDs.

8 Claims, 11 Drawing Sheets

PARITY GROUPS A-H, J-N, P, & Q ILLUSTRATIVELY DISTRIBUTED OVER A DASD ARRAY ACCORDING TO A BALANCED INCOMPLETE BLOCK DESIGN PER THE FIRST METHOD STEP.

| DASD I | DASD II | DASD III | DASD IV | DASD V | DASD VI | DASD VII | DASD VIII | DASD IX | DASD X |
|---|---|---|---|---|---|---|---|---|---|
| A | A | B | C | A | B | C | A | B | C |
| B | D | D | D | E | F | G | E | F | G |
| C | F | E | E | H | H | H | J | K | L |
| D | G | G | F | K | J | J | M | M | M |
| H | J | K | L | L | L | K | P | N | N |
| M | N | P | Q | N | P | Q | Q | Q | P |

IN THE EVENT THAT SAY ARRAY DASD V WAS NOT AVAILABLE, THEN ANY PARITY GROUP WOULD BE ACCESSED FROM THE REMAINING DASDS AND THE MISSING DATA RECOVERED BY XOR OF ACCESSED BLOCKS OF THE GROUP. ASSUME THAT GROUPS A, E, H, K, L, & N WERE TO BE SUCCESSIVELY REFERENCED PER THE SECOND METHOD STEP

| PARITY GROUP | DASDS ACCESSED ASSUMING DASD V UNAVAILABLE |
|---|---|
| A | I, II, VIII |
| E | III, IV, VIII |
| H | I, VI, VII |
| K | III, VII, IX |
| L | IV, VI, X |
| N | II, IX, X |

DASD ARRAY ACCESS PATTERN IN THE PRESENCE OF A SINGLE DASD FAILURE FOR PARITY GROUPS DISTRIBUTED IN A BIBD MANNER

FIG. 1 – DASD ARRAY
(PRIOR ART)

FIG. 2 - RAID CONFIGURATION
(PRIOR ART)

FIG. 3 — RAID Configuration Distributed Parity for C=4, S=2, K=C 25% Parity

FIG. 4 — RAID Configuration Distributed Parity for C=4, S=2, K=C 25% Parity = 1/K

$$\text{TOTAL DEGRADED LOAD} \atop K=3 = \left[ R + 4W + \frac{R - 5W}{8} \right] \text{ACCESSES}$$

Reference
$$\text{TOTAL DEGRADED LOAD} \atop K=C=4 = \left[ R + 4W + \frac{2R - 4W}{8} \right] \text{ACCESSES}$$

General
$$\text{TOTAL DEGRADED LOAD} = \left[ R + 4W + \frac{(K-2)R + (K-8)W}{S*C} \right] \text{ACCESSES}$$

FIG. 5 — K=2 Configuration
Distributed Parity
for C=4, S=2, K=C
33% Parity = 1/K (a) (R/W)=1, S=2

(b) (R/W)=3, S=2

(c) (R/W)=1, S=7

(d) (R/W)=3, S=7

General
$$\text{TOTAL DEGRADED LOAD} = \left[ R + 4W + \frac{(K-2)R + (K-8)W}{S * C} \right] \text{ ACCESSES}$$

FIG. 5A — Degraded Load = f(S,C,K)

FIG. 6 – STRINGS WITH SKEW

FIG. 7 – STRING WITH NO SKEW

FIG. 8 — DISTRIBUTED DATA REGIONS

FIG. 9 – DISTRIBUTED DATA REGIONS

PARITY GROUPS A-H, J-N, P, & Q ILLUSTRATIVELY DISTRIBUTED
OVER A DASD ARRAY ACCORDING TO A BALANCED INCOMPLETE
BLOCK DESIGN PER THE FIRST METHOD STEP.

| DASD I | DASD II | DASD III | DASD IV | DASD V | DASD VI | DASD VII | DASD VIII | DASD IX | DASD X |
|---|---|---|---|---|---|---|---|---|---|
| A | A | B | C | A | B | C | A | B | C |
| B | D | D | D | E | F | G | E | F | G |
| C | F | E | E | H | H | H | J | K | L |
| D | G | G | F | K | J | J | M | M | M |
| H | J | K | L | L | L | K | P | N | N |
| M | N | P | Q | N | P | Q | Q | Q | P |

IN THE EVENT THAT SAY ARRAY DASD V WAS NOT AVAILABLE,
THEN ANY PARITY GROUP WOULD BE ACCESSED FROM THE
REMAINING DASDS AND THE MISSING DATA RECOVERED BY XOR
OF ACCESSED BLOCKS OF THE GROUP. ASSUME THAT GROUPS
A, E, H, K, L, & N WERE TO BE SUCCESSIVELY REFERENCED PER
THE SECOND METHOD STEP

| PARITY GROUP | DASDS ACCESSED ASSUMING DASD V UNAVAILABLE |
|---|---|
| A | I, II, VIII |
| E | III, IV, VIII |
| H | I, VI, VII |
| K | III, VII, IX |
| L | IV, VI, X |
| N | II, IX, X |

DASD ARRAY ACCESS PATTERN IN THE PRESENCE OF A
SINGLE DASD FAILURE FOR PARITY GROUPS DISTRIBUTED
IN A BIBD MANNER

*FIG. 10*

METHOD AND MEANS FOR MANAGING DASD ARRAY ACCESSES WHEN OPERATING IN DEGRADED MODE

FIELD OF THE INVENTION

This invention relates to managing an array of direct access storage devices (DASD's), and more particularly, for balancing the additional loading (read and write accessing) accruing to remaining array elements when at least one of the DASD's is unavailable.

DESCRIPTION OF RELATED ART

It is well known that a DASD is a cyclic track storage device attached to a computing system by a controller or device adapter. One controller may attach a "string" of DASD's. Any DASD in the string is selected or accessed on a mutually exclusive basis. Brady et al, U.S. Ser. No. 07/528,999, filed: May 24, 1990, entitled "METHOD AND MEANS FOR ACCESSING DASD ARRAYS WITH TUNED DATA TRANSFER RATE AND CONCURRENCY", discloses the mapping of a sequential file of N*K data and parity blocks, K blocks per track per DASD, onto a two dimensional array (one spatial and one temporal dimension) by synchronously accessing N DASD's through counterpart controllers for the duration of one track revolution.

Ouchi and Clark Patents and Parity Blocks

Ouchi, U.S. Pat. No. 4,092,732, "System For Recovering Data Stored In A Failed Memory Unit", issued May 30, 1978, discloses the spreading of data blocks from the same logical file across a string of N-1 failure independent DASDs and recording a parity block on the Nth DASD. According to Ouchi, the parity block is an XORing of the contents of the N-1 other blocks. Contents from any single inaccessible DASD can be recovered by XORing the parity blocks with the blocks stored on the N-2 remaining accessible DASDs. A similar result can be achieved if the parity blocks are not available.

Clark et al, U.S. Pat. No. 4,761,785, "Parity Spreading to Enhance Storage Access", issued Aug. 2, 1988, modifies Ouchi by distributing parity blocks over DASDs such that the unavailability of one DASD (i.e. the parity DASD in Ouchi) would avoid rendering all parity blocks unavailable especially for operation in degraded mode.

Intra-block Parity And The Parity Code Block Distinguished

Typically, a parity suffix or equivalent is appended to each data block and may be used in the detection or correction of intra-block error. Efficient intra-block codes per se (Hamming, Cyclic Redundancy Check, Reed-Solomon) are elsewhere treated in the literature. In contrast, parity blocks, as described in Ouchi, are involved when one or more of the data blocks of an N-1 sequence are unavailable. In that event, the parity block, which a' priori spans an N-1 block sequence, is XOR'ed with the remaining blocks to rebuild the unavailable data block.

Patterson's DASD Array Levels

Patterson et al, "A Case For Redundant Arrays of Inexpensive Disks (RAID)", ACM SigMOD Conference, Chicago, Ill., Jun. 1-3, 1988 discusses various ways of organizing redundant data and DASD's to enhance data availability. In this regard, Patterson describes logical record to physical track mapping and accessing onto a DASD array in column major order thereby accommodating both small and large access requests. Furthermore, he describes the calculation of new parity block as the XORing of old data, new data, and old parity.

Patterson's third level or array type causes reads and writes to be made synchronously to N DASD's. In this arrangement, N-1 DASD's contain data and one DASD contains a parity ranging over the other data DASDs. That is, one check DASD is provided for the group. The contents of the failed DASD can be reconstructed in the manner of Ouchi.

Patterson's fourth level improves performance with respect to small read and write accesses. This is achieved by storing blocks along the column extent so that in a first time slot ( DASD sector 1) blocks 1 to N can respectively be stored on DASD 1 to N while in the second time slot (DASD sector 2) blocks N+1 to 2N are stored etc. In the Kth time slot (DASD sector K) blocks $[(K-1)]*N+1$ to KN are stored on corresponding devices.

In addition to column track layout, the fourth level permits access to DASD individually. This means that small transfers can occupy few DASDs while large transfers can also be accessed synchronously across N devices.

Parity Group Defined

According to Patterson, it is known to distribute data and parity blocks such that in an C*S array of C controllers and S DASD's per controller string, a physical area (or region) on each of K=C different DASDs in K=C different strings constitutes a "parity group" where one of the areas (or region) is the parity of the data contained in the other K-1 areas (or regions).

One consequence of spreading the blocks of a parity group among K failure independent DASD's and strings is that the mean time between data failure (MTBF) is much higher than that of each individual physical DASD. This is because the array can continue to operate, in degraded mode, even after the failure of one of the individual drives (or a controller) in the array. Additionally, data on the failed DASD can be re-created from the data and parity on the remaining K-1 DASDs that have not failed.

Array Loading And Operation In Degraded Mode

Array work is measured as the number of read and write requests executed by the DASD's. The distribution of such requests is a function of the distribution of data. In turn, the distribution of data including redundancies is a function of load balancing, recovery, and degraded mode operation. Parenthetically, read and write requests may each comprise multiple substituent read (R) and write (W) operations.

An array operating in "degraded mode" means that the array continues in operation notwithstanding the fact that an element in the path to the data such as a controller or DASD is unavailable usually due to fault, failure, or interruption. The prior art teaches several distributions of data and parity blocks among the array DASD's (and their disks). Such distributions have resulted in significant load imbalance to the SC-1 or fewer other DASD once a given DASD or controller becomes unavailable. One result of the imbalance is that some DASD are being accessed significantly more than others with a concomitant change in the loading and performance statistics of both the array elements and the path to data.

SUMMARY OF THE INVENTION

It is an object of this invention to devise a method and means for managing DASD array access such that in the event of the unavailability of data on one or more of the DASD, data could be reconstructed and array could continue operation where the additional access load per DASD would be minimized and uniformly distributed.

In this invention where the parity location is not explicitly shown within a parity group, it is implied that each region of each DASD included within the parity group can be sub-divided such that parity blocks are uniformly distributed among all the regions.

In this invention, parity groups of the same or disparate size are uniformly distributed among array elements. Also, it was found that by restricting the groups to a small size, minimal additional loading for each array DASD when operating in degraded or failure mode can be guaranteed.

As used in this specification, the term "block" has two meanings. The first refers to a information type of standard size say 4096 bytes used for data or parity encoding and recording purposes. The second refers to combinatorial distribution of parity groups including replications to effectuate uniformity of access load using deterministic processes otherwise used in the design of experiments.

In this invention, a statistically balanced incomplete block design (BIBD) is used in a preferred embodiment to guaranty a near uniform distribution and recording of parity groups over the C*S array of C controllers and S DASD's per controller. To satisfy the design, each DASD is partitioned into N equal sized regions or recording areas, and, the N regions are assigned to the parity groups such that:

(1) any two regions in the same parity group are located on different DASD's or different strings of DASDs;

(2) each of the N regions on each DASD or string of DASD's is assigned to a different parity group;

(3) for every pair of DASD's or every pair of DASD strings, there is assigned exactly M parity groups containing regions from both DASD's or strings of DASD's.

Advantageously, the method of the invention embodying these observations comprises the steps of (a) forming and writing parity groups of K areas/group approximately uniformly over counterpart DASD in the array as generated by a deterministic process; and (b) responsive to the unavailability of a path to addressable information on a designated DASD, accessing the remaining C*S-1 other DASD in a minimal referencing pattern as a function of the uniformity of the distribution of parity groups.

Also, certain BIB designs or balanced complete block designs on strings of DASD's have the properties that:

(4) every pair of DASD's on the same string have no parity group in common, and;

(5) every pair of DASD's not on the same string has exactly M' parity groups containing regions from both DASD's.

When block designs on strings of DASD's have the properties (1) through (5), a single string failure or a single DASD failure causes additional work in the array to be uniformly distributed among the remaining working strings and uniformly distributed among the DASD's on those strings.

The balanced block designs satisfying this new use, in addition to the BIBD, include Latin Squares, and Hadamard matrices. Also, if each parity group was kept lower than the number of controllers i.e. K<C, then additional DASD space so used would further reduce the loading/DASD.

If each DASD receives AW access requests, then the requests or work load per region is AW/N. When a DASD fails or otherwise becomes unavailable, the data within a region can be reconstructed by accessing the K-1 other regions within its associated parity group. Since any one of the C*S-1 other DASD's has exactly M parity groups in common with the unavailable DASD, then it will receive an additional load of M*AW/N.

DESCRIPTION OF THE PREFERRED EMBODIMENT

The invention arises out of a new use for a statistically balanced block design or other uniform distribution of parity groups across a DASD array. The new use comprises the steps of (a) forming and writing parity groups according to a balanced block design or equivalent; and (b) accessing remaining DASD's in the array in a minimal referencing pattern as a function of the parity group distribution given the unavailability of a path to data (failed control unit or DASD).

Block designs are derived from the design of experiments in which test objects are arranged in enumeratively exhaustive sub-sets blocks) and exposed to an experimental regime. The pattern and replication of the objects permits distinguishing various responses to the experimental regime as being a consequence of chance or a result of one or more co-factors. Time available, test economics, and sensitivity limit the size and the degree of enumerative exhaustion possible. For these reasons, there are many block design modalities yielding uniform distribution of objects. Among ones of interest include Balanced Incomplete Block Design (BIBD), Latin Squares, and Hadamard Matrices. Reference should also be made to Raghavarao, "Constructions And Combinatorial Problems In The Design Of Experiments", copyright Dover Publications 1971, 1988 and Berman and Fryer, "Introduction to Combinatorics", copyright Academic Press Inc. 1972.

The following discussion is directed to illustrating the method steps using BIBD.

Balanced Incomplete Block Design And DASD Arrays

Each object v(i) in a set of v objects termed "varieties" is replicated r times to form a collection of v*r objects. The v*r objects are distributed into b subsets called blocks. Each block contains k of v varieties with no block containing a variety more than once. Consequently, $$v*r = b*k. \quad (1)$$

Furthermore, each pair of varieties v(i),v(j) can occur in exactly lambda blocks. Thus, there are v*(v-1)/2 pairs of varieties and each block contains k*(k-1)/2 of the v*(v-1)/2 pairs. Since every variety occurs in exactly r blocks, every variety occurs in r*(k-1) pairs. From this is derived the relation $$lambda*v*(v-1)/2 = b*k*(k-1)/2 \quad (2)$$

$$lambda*(v-1) = r*(k-1) \quad (3)$$

Restated, a system of blocks satisfying (1)-(3) is termed a (b,v,r,k,lambda) BIBD. It is an arrangement of v varieties formed into b blocks such that:

(1) each block contains exactly k varieties;
(2) every pair of varieties occurs together in exactly lambda blocks; and
(3) the varieties are replicated exactly r times. DASD array can be constructed from a BIBD by mapping:

variety→DASD block→parity group

Then,
array size C*S = v,
number of parity groups = b,
size of each parity group (now a constant) K = k,
number of regions per DASD N = r, and
M = lambda.

The resulting array has the following characteristics:
(1) each parity group is associated with K distinct DASD's
(2) each DASD occurs in N parity groups
(3) any pair of DASD's occur together in M parity groups.

Figure 1:
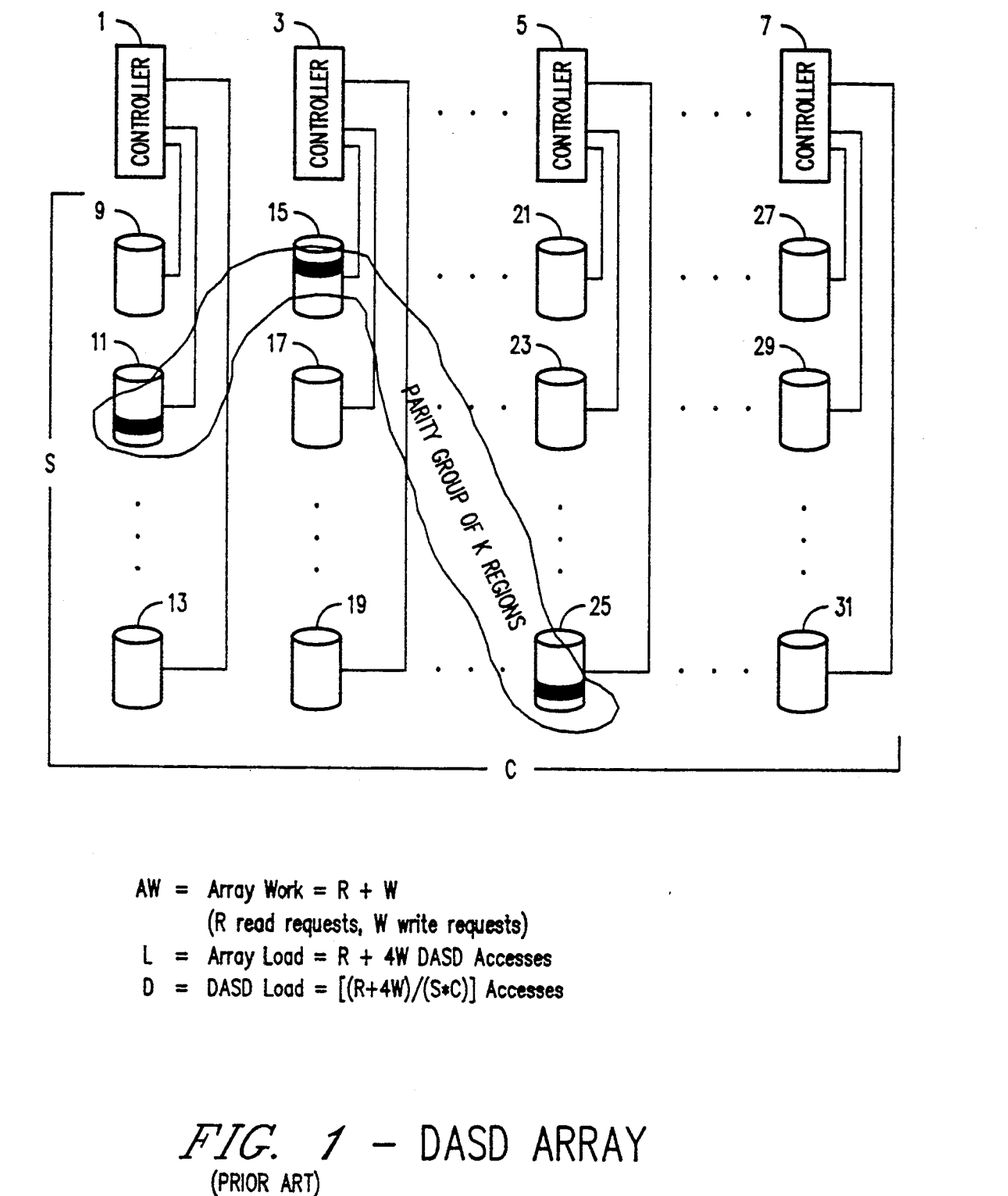
FIG. 1 shows a distribution of a parity group of data blocks among disparate DASD's in an array according to the prior art.

Distribution of Regions (Blocks) of a Parity Group Across DASD's In The Prior Art Referring now to FIG. 1, there is shown a distribution of a parity group of data blocks among disparate DASD's in an array in the manner of Patterson proposed as a solution for providing high availability. These arrays are arranged in rectangular structure with S DASDs/controller (strings 9,11,13; 15,17,19; 21,23,25; and 27,29,31) and C controllers 1, 3, 5, and 7.

This array has a total of C*S DASDs. A physical area (or region) on each of K different DASDs in K different strings constitutes a "Parity Group" where one of the areas (or region) is the parity of the data contained in the other K-1 areas (or regions).

The processing of a read request has no adverse affect on performance of the array. However, the processing of a write request involves multiple read and write accesses and compute operations. Relatedly, the old data and parity blocks must be first read. Next, the new parity is formed from the exclusive OR'ing of the old data block, the new data block, and the old parity block. It is then necessary to write the new data and parity blocks to their data DASD and parity DASD array locations. Thus, a read request is satisfied by one access while a write request requires four accesses.

Given an array subject to R read requests and W write requests, then the R read requests and W write requests are transformed into an array load of R+4W DASD accesses. Significantly, if the load is uniformly spread over the C*S DASDs, then each DASD will have a load of (R+4W)/(C*S) accesses.

Figure 2:
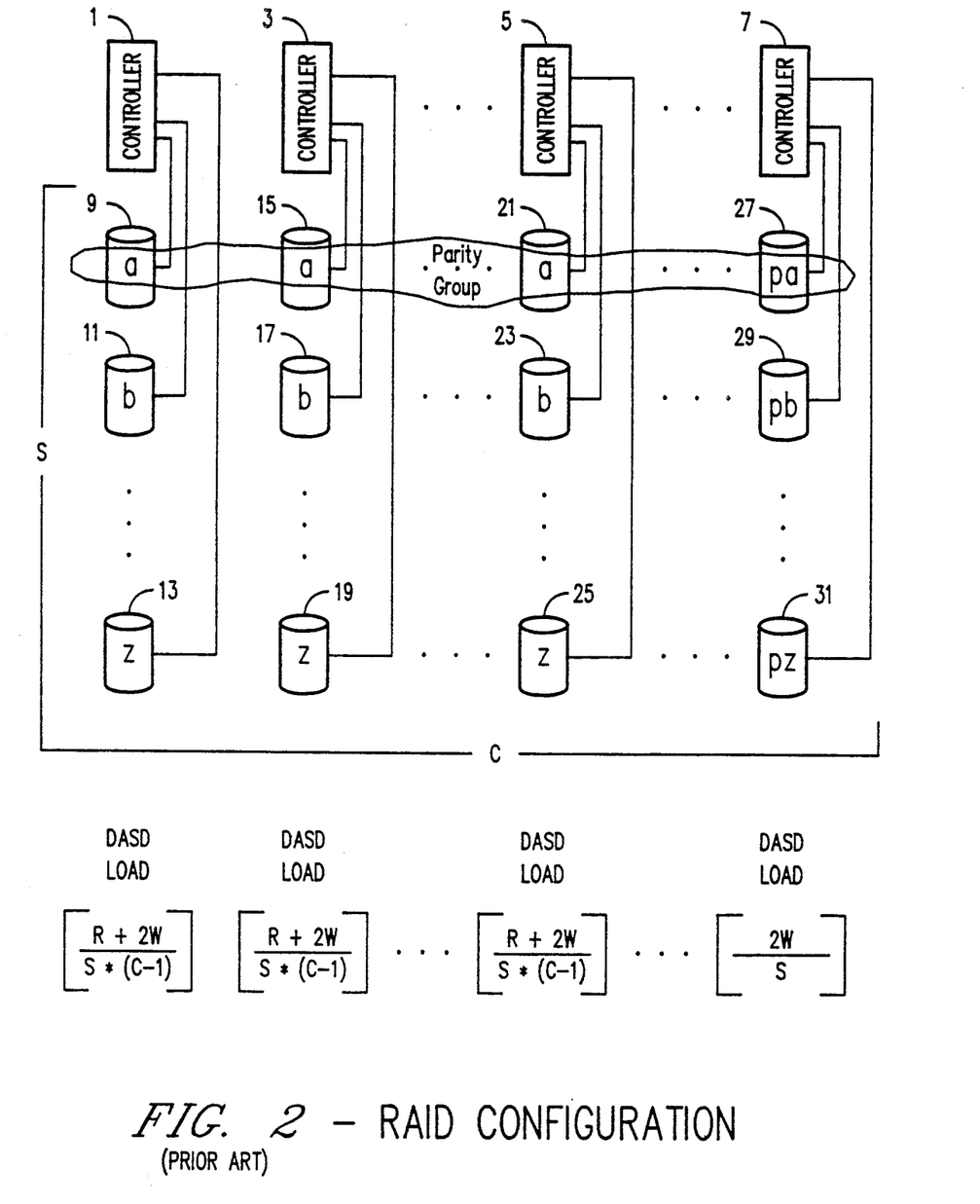
FIG. 2 also shows a distribution of parity groups of data blocks across a DASD array row vector such that all parity blocks are mapped onto a column vector of DASD's attached to the same controller.

Referring now to FIG. 2, there is shown a distribution of parity groups of data blocks across a DASD array row vector such that all parity blocks are mapped onto a column vector of DASD's attached to the same controller. Each parity group of K=C areas. The areas labeled "a", "b", etc., contain data. Other areas, labeled "pa", "pb", "pc", ..., "pz", are used to hold parity information from the corresponding K<C data areas. It is well known, that if all the parity information is contained on DASD's in the same string, then the accesses will be non-uniformly distributed such as illustrated in this figure.

Each DASD in the parity string will have an access load of (2W)/(S) accesses while each DASD in the other strings will have an access load of (R+2W)/(S*(C-1)) accesses. It is commonly accepted that such a non-uniformly distributed load has undesirable performance penalties.

Figure 3:
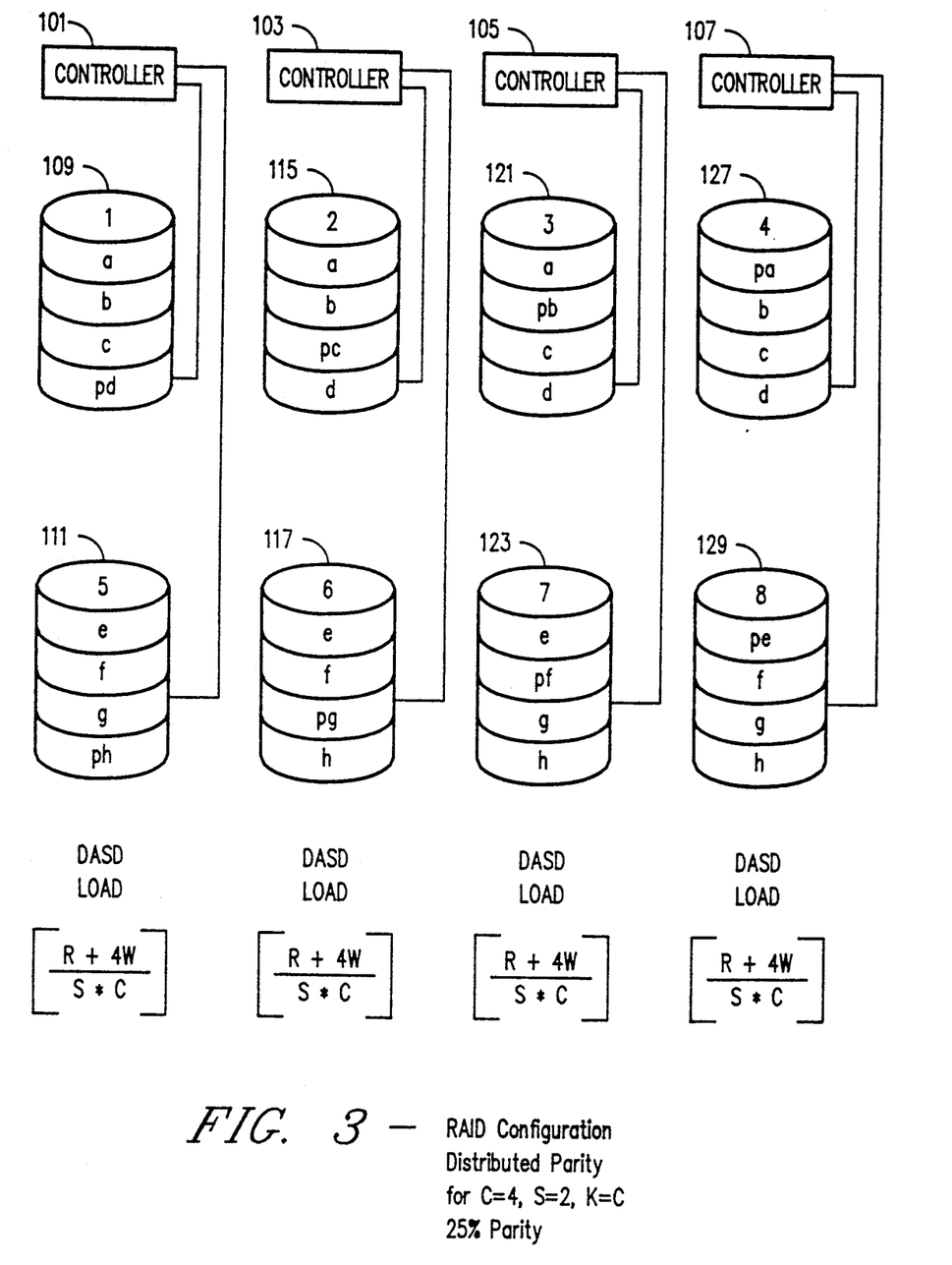
FIGS. 3 and 4 depict distributions of parity groups of data blocks across a DASD array facilitating data reconstruction in the event of single DASD failure.
Figure 4:
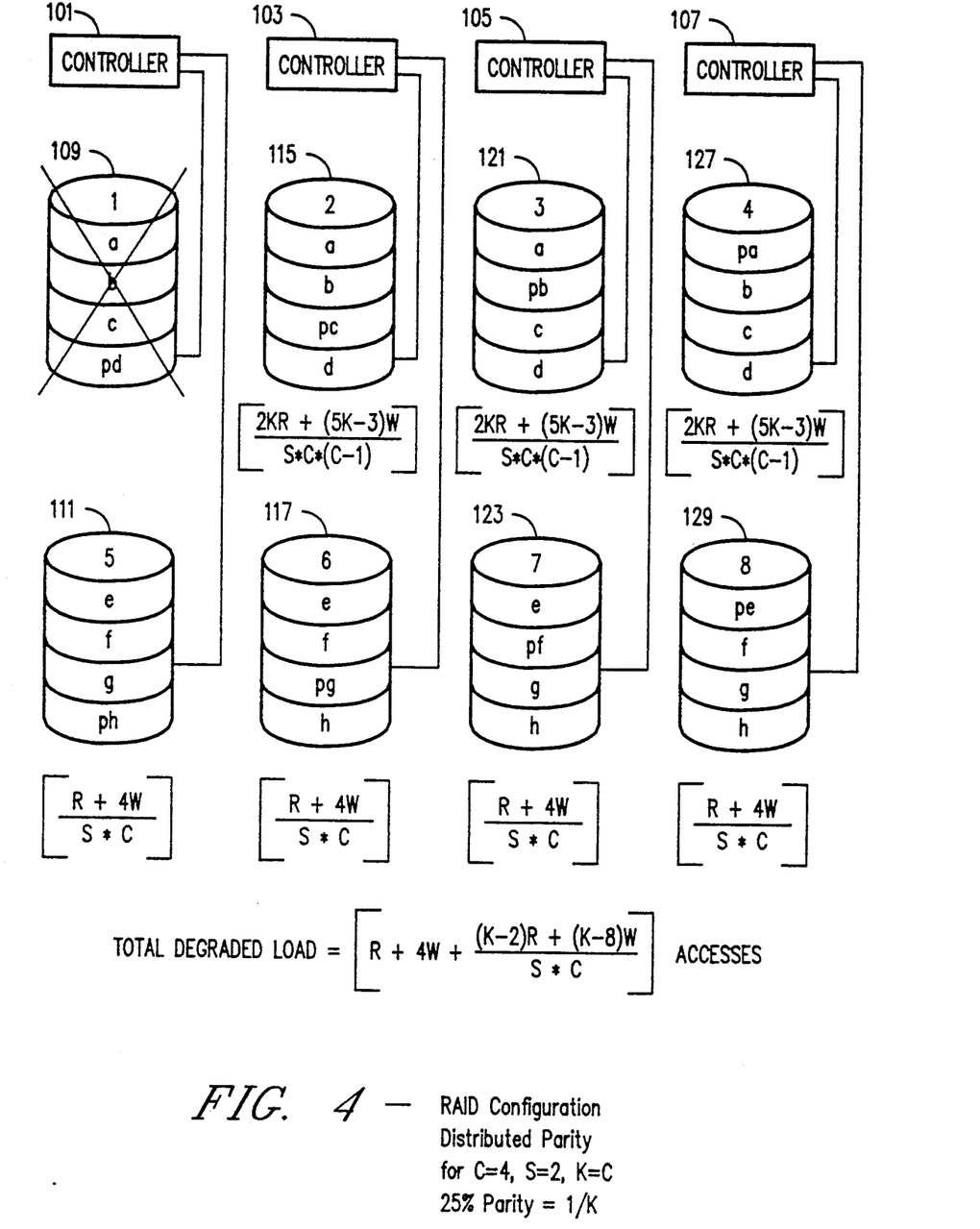

Referring now FIGS. 3 and 4 there are depicted distributions of parity groups of data blocks across a DASD array facilitating data reconstruction in the event of single DASD failure.

In FIG. 3, array controllers 101, 103, 105, and 107 respectively couple DASD strings 109,111; 115,117; 121,123; and 127,129. Illustratively, in order to balance the access load on the system in the prior art, it was common to distribute the parity areas in an C*S array of dimension 4X2 where DASD's 109, 115, 121 each have physical spaces called "a" that contain data. DASD 127 has a physical space called "pa" that is used to hold the parity information over the 3 other physical spaces called "a". In a similar manner, the DASD's each have physical spaces called "b" that contain data and DASD 121 has a physical space called "pb". With this configuration that for K=4, 1/K=25% of each DASD is used for parity information.

Assuming that the array work is uniformly distributed over the physical data regions in an array such as shown in FIG. 3, each data region will have (R+W)/((K-1)*S*C)requests. Due to the parity, this work will be transformed into (R+2W)/((K-1)*S*C) real accesses to each data region and 2W/(S*C) real accesses to each parity region. Thus, each DASD will have (R+4W)/(S*C) real accesses independent of its position in the array.

Referring now to FIG. 4, if a DASD in an array fails, the array can still function in degraded mode by reconstructing data from existing data plus the parity. For example, if DASD 109 fails, then read requests for data in region "a" on DASD 109 can be satisfied by reading the corresponding fields in regions "a" on DASD's 115 and 121, and region "pa" on DASD 127 and then reconstructing the data that was in region "a" on DASD 109. Thus, each read request to a data region on a failed DASD gets transformed into $(K-1)=(C-1)=3$ read requests. A write request to region "a" on DASD 109 can be satisfied by reading the corresponding fields in regions "a" on DASD's 115 and 121, constructing the new parity, and writing it in region "pa" on DASD 127. Thus, each write request to a data region on a failed DASD becomes transformed into $K-2)=(C-2)=2$ read requests and one write request.

Assuming that the array work is uniformly distributed over the physical data regions in an array such as shown in FIG. 4, each data region will have $(R+W)/(S*C*(K-1))$ requests. If DASD 109 fails, the operation of DASD's 111, 117, 123, and 129 will be unaltered. Also, each of those DASD's will still have $(R+4W)/(S*C)$ real accesses.

Each read request to a data region on DASD's 115, 121, 127 results in exactly one read request. Each write request to data regions "a", "b", or "c" on DASD's 115, 121, or 127 results in two read requests and two write requests as before. However, a write request to data region "d" on DASD's 115, 121, or 127 results in only one write request. Thus, the $(R+W)/(S*C)$ requests to each DASD 115, 121, or 127 will be transformed into $((K-1)R+(4K-7)W)/((K-1)*S*C)$ accesses where $K=C$. Additionally, each read request to DASD 109 generates one read request to each of DASD's 115, 121, and 127 and each write request to DASD 109 generates either one read or one write request to each of DASD's 115, 121, and 127. Thus, the total load on each of the DAD's 115, 121, and 127 is $(2(K-1)R+(5K-8)W)/((K-1)*S*C)$ where $K=C$.

From the above for FIG. 4, the total load on an array with one DASD failure as $R+4W+(((K-2)R+(K-8)W))/(S*C))$, Thus, each string in the array has an unbalanced load after DASD 109 fails.

Figure 5:
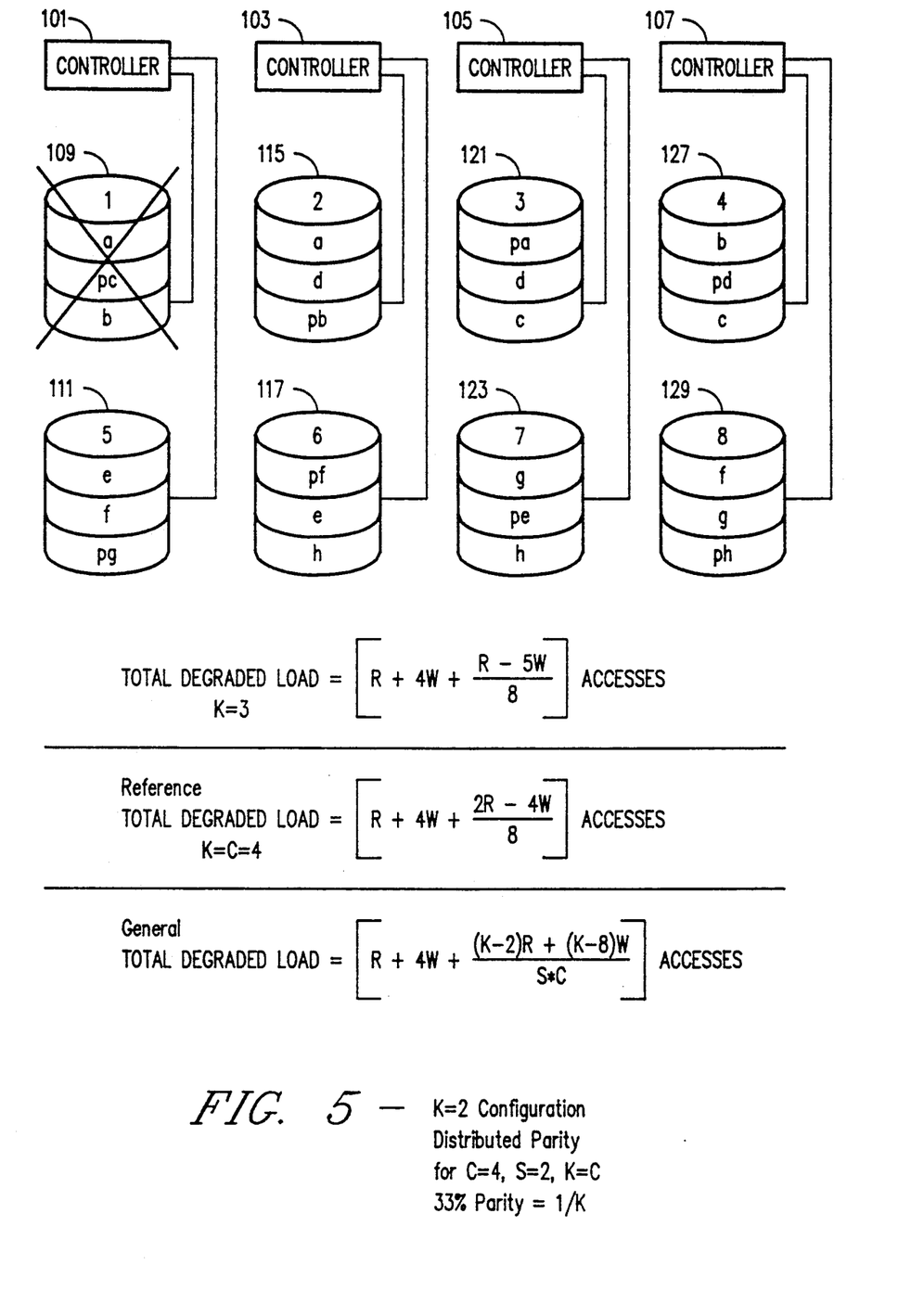
FIGS. 5 and 5A illustrate the load imbalances resulting from the unavailability of a single DASD on the remaining DASD's within a string or array.
Figure 5A:
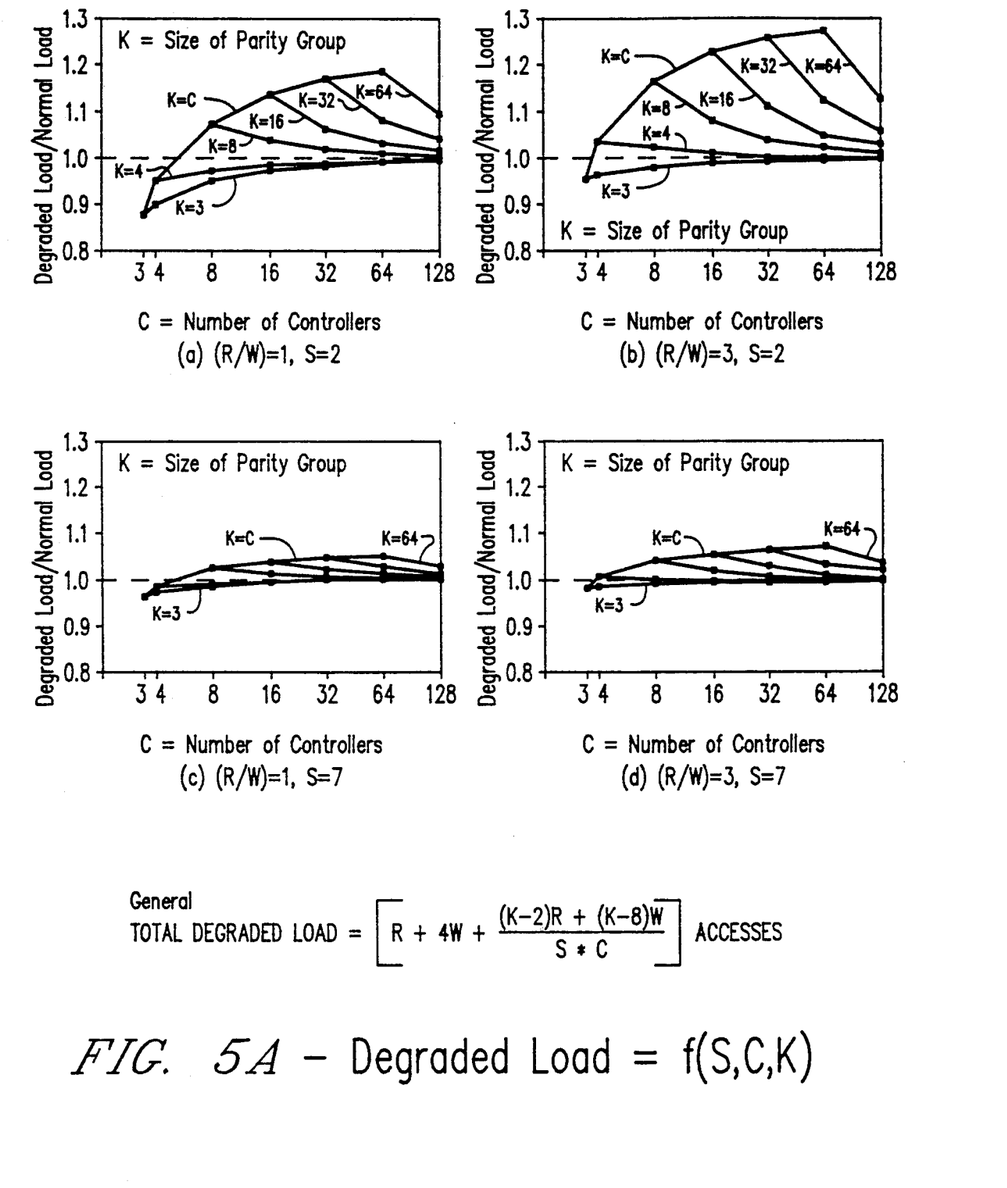

The Effect Of Constraining Parity Group Size According to The Method Of The Invention Referring now to FIGS. 5 and 5A, there are illustrated the load imbalances resulting from the unavailability of a single DASD on the remaining DASD's within a string or array. In this regard, FIG. 5 depicts an array with $S=2$ and $C=4$ and $K=2$ to show the data regions and parity regions. With a failed DASD 109, a request for data in region "a" on DASD 109 results in accesses to region "a" on DASD 115 and region "pa" on DASD 121. However, there is no access to DASD 127. Thus, the reduced load on the array. For the example shown in FIG. 5, the extra load on the array is $(R-5W)/8$ with $K=3$. This should be compared to $(2R-4W)/8$ in the array set out in FIG. 4 with $K=4$.

The penalty paid for going from $K=4$ to $K=3$ is that more DASD space is taken up with parity data. ⅓ of each DASD has parity data when $K=3$ compared to ¼ of each DASD containing parity data when $K=4$. In general, $1/K$ of each DASD contains parity data.

Figure 6:
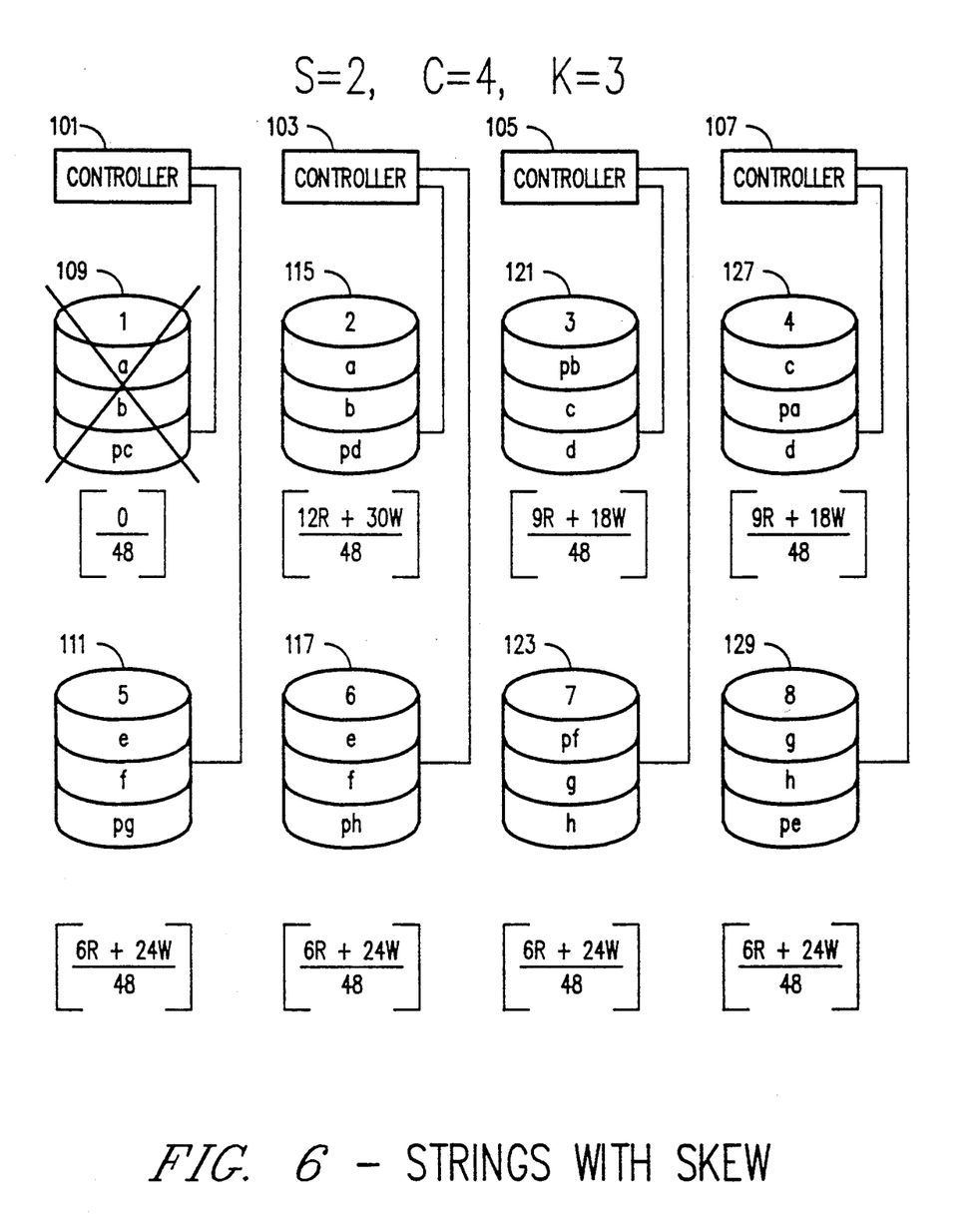
FIGS. 6-9 set forth the principle of the invention that a uniform distribution of parity groups among DASD strings in an array shall (1) upon a string failure, uniformly distribute the additional load upon the other strings and among the DASD's on these strings; and (2) upon a DASD failure, uniformly distribute the additional load among the other DASD's on the other strings.

Referring now to FIG. 5A, there is set out the effect of $S=$string length, $C=$number of controllers, $(R/W)=$read-write ratio, and K on the degraded array load for string lengths S of 2 and 7, read-write ratios of 1 and 3, number of controllers ranging from 3 to 128, and values of K ranging from 2 to 63. The vertical axis on each graph is normalized to show the ratio of degraded load accesses to normal load accesses. It should be noted that with $K=C$, which has been the array standard, the ratio of degraded mode accesses to normal mode accesses is an increasing function of the number of controllers, whereas, with a fixed value of K the rate of increase is less or it decreases as controllers are added. In FIG. 6, the access skew is illustrated for $K=3$ when DASD 109 fails.

Figure 7:
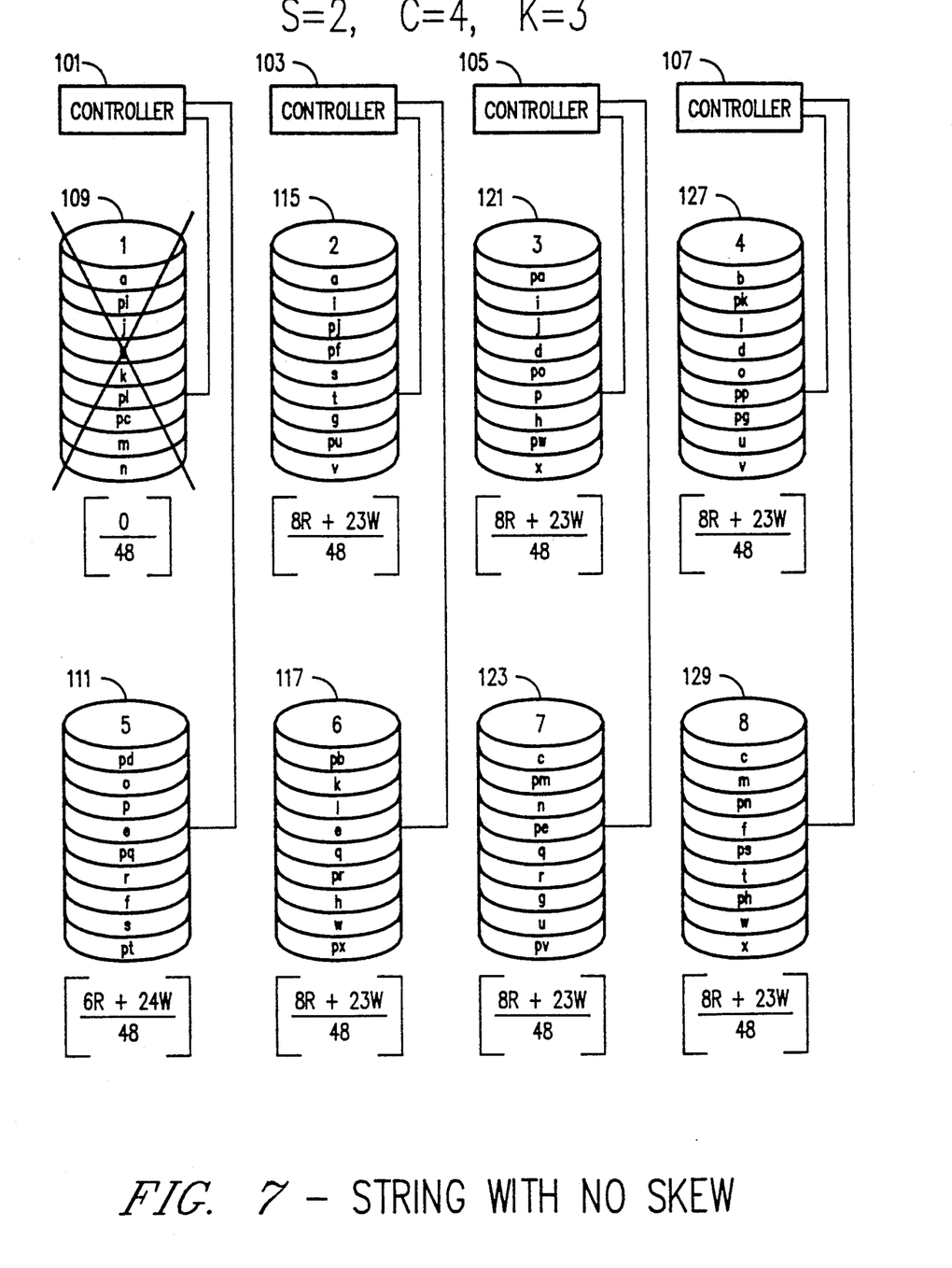
Figure 8:
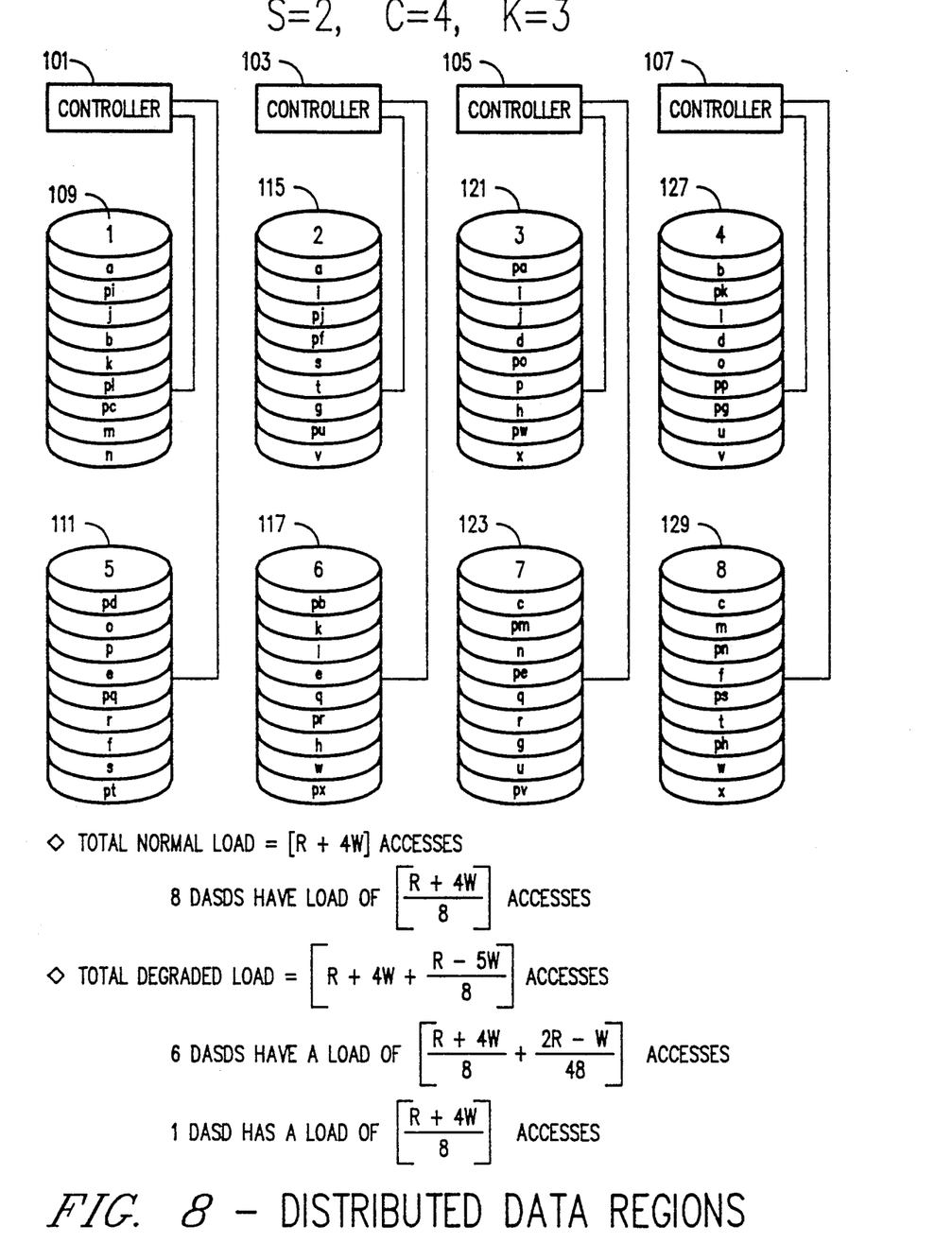
Figure 9:
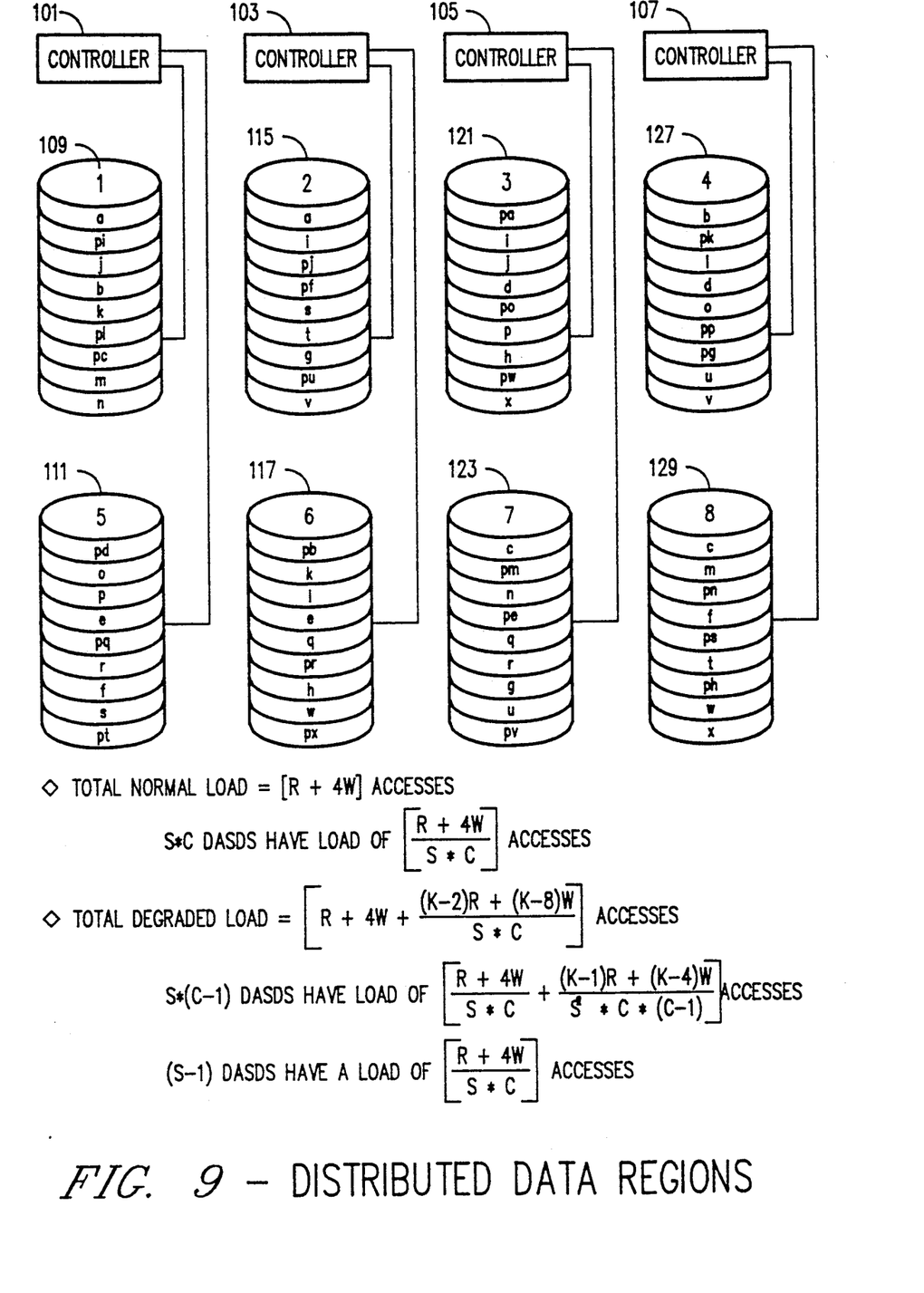

Uniform Distributions According to The Invention And Their Effect Upon Loading Referring now to FIGS. 7-9, there is set forth the principle of the invention that a uniform distribution of parity groups among DASD's in an array will minimize the additional load per DASD occasioned by the unavailability of the data on one of the DASD.

An application of this invention as illustrated in FIGS. 7-9 requires that the parity groups be allocated on the strings of the DASD's such that:

(1) any two regions in the same parity group are located on different strings;

(2) each of the N regions on each string is assigned to a different parity group;

(3) for each pair of strings, there are exactly M parity groups containing regions from both strings;

(4) every pair of DASD's on the same string have no parity group in common; and (5) every pair of DASD's not on the same string have exactly M' parity groups containing regions from both DASD's.

Referring again to FIG. 7, there are depicted data regions shown for $K=3$, $S=2$, and $C=4$. Each string is divided into 18 regions and a BIBD is constructed with $v=C=4$ strings, $N=18$ regions per string, $b=24$ parity groups, $k=K=3$ regions per parity group, and lambda$=12$. Thus, any controller or string failure produces an additional load on the other strings of the array which is uniformly distributed on the 3 other strings. It is the case that a pair of DASD's on each string have no parity groups in common. It is further the case, that every pair of DASD's not on the same string has exactly $M'=3$ parity groups in common. If the array load is uniformly spread over the S*C DASD's when all the DASD's are working, and if any one DASD fails, then the degraded load is spread as follows: the $S-1=1$ in the string with the failed DASD have no change in their access load; the $(S*(C-1))=6$ remaining DASDs in the array have the remaining degraded load uniformly spread over the DASDs. Thus, when a DASD fails, no string in the array has any skew. This is summarized in FIG. 8 for the specific array with $K=3$, $S=2$, and $C=4$ and the data regions as shown. The state of affairs is also summarized in FIG. 9 for any array with parity groups allocated to disks such that the degraded load is uniformly spread over the $(S*(C-1))$ disks which take the degraded load.

TABLE 1

Illustrative Example Of A Uniform Distribution According To
The Method Of The Invention
As an example of doing such a mapping, consider the following
BIBD with b = 15, v = 10, r = 6, k = 4, lambda = 2.

| | | | | | | BLOCKS | | | | | | | | |
|---|---|---|---|---|---|---|---|---|---|---|---|---|---|---|
| A | B | C | D | E | F | G | H | J | K | L | M | N | P | Q |
| 1 | 1 | 1 | 1 | 3 | 2 | 2 | 1 | 2 | 3 | 4 | 1 | 2 | 3 | 4 |
| 2 | 3 | 4 | 2 | 4 | 4 | 3 | 5 | 6 | 5 | 5 | 8 | 5 | 6 | 7 |
| 5 | 6 | 7 | 3 | 5 | 6 | 7 | 6 | 7 | 7 | 6 | 9 | 9 | 8 | 8 |
| 8 | 9 | 10 | 4 | 8 | 9 | 10 | 7 | 8 | 9 | 10 | 10 | 10 | 10 | 9 |

This mapping can be used in an array of 10 DASD's with 15 parity groups, each DASD having 6 regions and each parity group consisting of 4 regions:

TABLE 2

Parity Grouping

| DASD 1 | DASD 2 | DASD 3 | DASD 4 | DASD 5 |
|---|---|---|---|---|
| A | A | B | C | A |
| B | D | D | D | E |
| C | F | E | E | H |
| D | G | G | F | K |
| H | J | K | L | L |
| M | N | P | Q | N |

| DASD 6 | DASD 7 | DASD 8 | DASD 9 | DASD 10 |
|---|---|---|---|---|
| B | C | A | B | C |
| F | G | E | F | G |
| H | H | J | K | L |
| J | J | M | M | M |
| L | K | P | N | N |
| P | Q | Q | Q | P |

Generation of The Uniform Distribution According To
The Method Of The Invention

There are different methods for generating BIBD. One of these methods is the lattice design which yields a design with $b = n*(n+1), v = n*n, r = n+1, k = n, lambda = 1.$ A simple lattice design is based on a square array containing the set of varieties. As an example, for the set of 3*3=9 varieties the square array would be

| 1 | 2 | 3 |
|---|---|---|
| 4 | 5 | 6 |
| 7 | 8 | 9 |

A lattice design uses blocks of n varieties in groups of n blocks. The first group consists of one block for each row of the array. The second group consists of one block for each column of the array. The other (n-1) groups are defined by superimposing on the n x n square array, arrays whose elements are the letters a, b, c, . . . , n arranged so that each letter occurs once in each row and once in each column. Thus the arrays

| a | b | c | | a | b | c |
|---|---|---|---|---|---|---|
| c | a | b | | b | c | a |
| b | c | a | | c | a | b | can be used to generate 2 groups of 3 blocks, each block being defined by the varieties associated with a letter. For instance, the letter 'a' of the left hand array would yield the block (1 5 9). The blocks of the resulting block design is as follows:

TABLE 3

| | | | | | BLOCKS | | | | | | |
|---|---|---|---|---|---|---|---|---|---|---|---|
| A | B | C | D | E | F | G | H | I | J | K | L |
| 1 | 4 | 7 | 1 | 2 | 3 | 1 | 2 | 3 | 1 | 2 | 3 |
| 2 | 5 | 8 | 4 | 5 | 6 | 5 | 6 | 4 | 6 | 4 | 5 |
| 3 | 6 | 9 | 7 | 8 | 9 | 9 | 7 | 8 | 8 | 9 | 7 |

The condition for uniform workload distribution in the event of a DASD failure can also be obtained by combining BIBD's in which the parity group sizes are not constant. Table 4 below illustrates such a situation where block designs with v1=7, b1=7, r1=3, k1=3, lambda1=1; and v2=7, b2=7, r2=4, k2=4, lambda2=2 are combined into one array where the following conditions are satisfied:

(1) any two regions in the same parity group are located on different DASD's;

(2) Each of the r1+r2=3+4=7 regions on each DASD is assigned to a different parity group; and (3) for every pair of DASD's, there are exactly lambda1+lambda2=3 parity groups containing regions from both DASD's.

TABLE 4

| DASD's | Parity Groups |
|---|---|
| DASD 1 | a b    e        j k    m n |
| DASD 2 | a   c    f      i    k l      n |
| DASD 3 | a     d      g i j    l m |
| DASD 4 |    b c        g h      k l m |
| | |
| DASD 5 |    b   d f    h   j    l    n |
| DASD 6 |      c d e    h i        m n |
| DASD 7 |        e f g h i j k |
| Grp Sz | 3 3 3 3 3 3 3 4 4 4 4 4 4 4 |

S = 7
N = 7   Parity Groups of size 3 and 4
M = 3

Thus the load produced by any DASD failure is uniformly distributed over the other DASD's in the array.

Extensions

Figure 10:
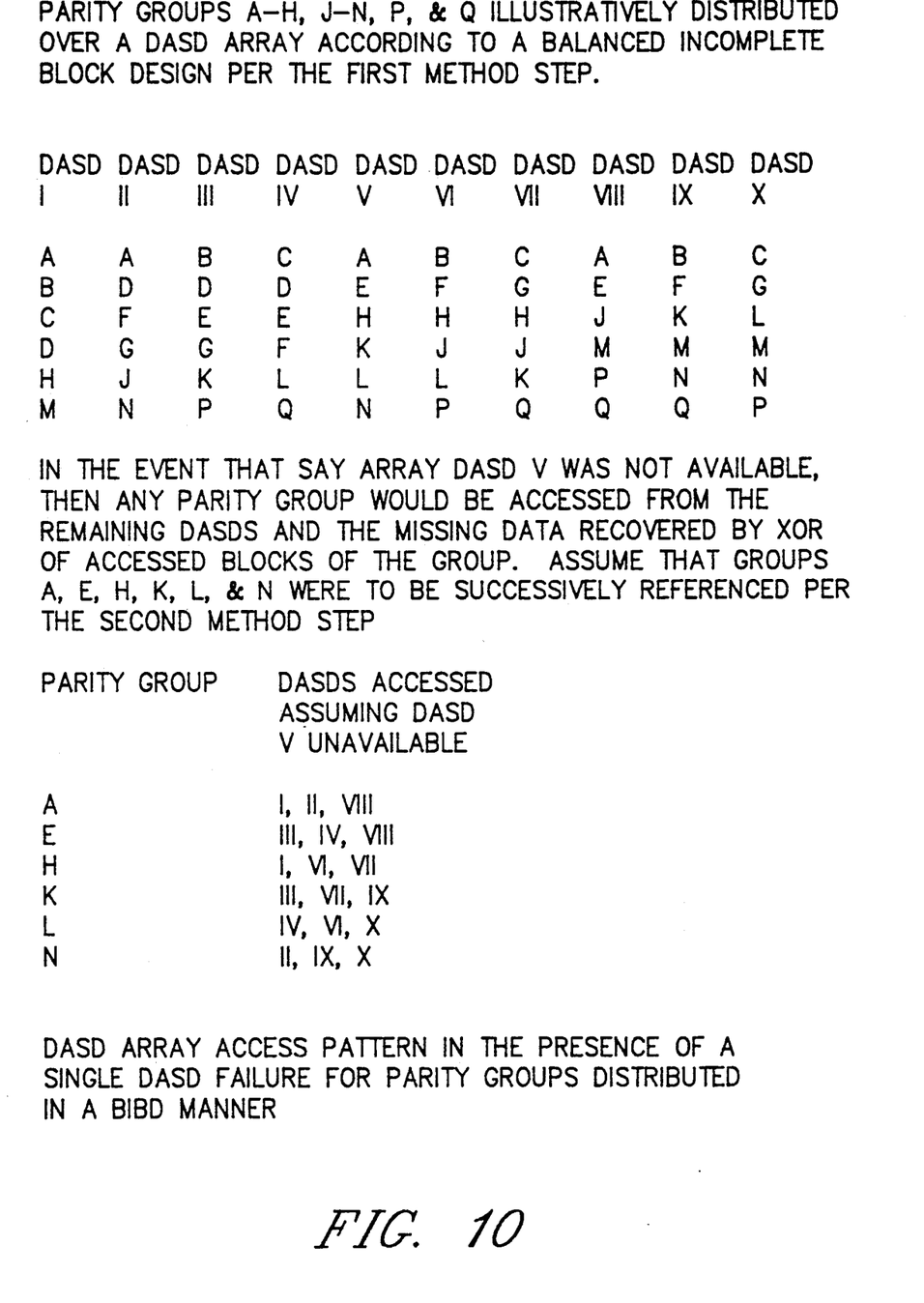
FIG. 10 shows an illustrative DADS array access pattern in the presence of a single DASD failure for parity groups distributed in a BIBD manner according to the invention.

Referring now to FIG. 10, there is shown a pattern of accessing parity groups when one of the DASDs in the array of DASDs I-X such as DASD V becomes unavailable. According to the first step of the method, parity groups A-H, J-N, P, & Q of say 4 blocks per group are written across DASDs in a uniform pattern such as that prescribed by the heretofore mentioned balanced incomplete block design (BIBD) as depicted in the top matrix. According to the second step of the method wherein it is assuming that a DASD becomes unavailable (i.e. DASD V) and an access pattern for groups A, E, H, K, L, and N (or any other for that matter), then the bottom matrix shows that effect on the loading resulting from the failure of DASD V is uniformly or near uniformly spread.

It should be appreciated that a balanced or uniform distribution of parity groups can be written to the array DASD's even where at least two of the data areas occupied by the parity groups are not equal or otherwise incommensurable. Also, some of the DASD's can have unassigned recording space not used in the array during normal operations. These and other extensions of the invention may be made without departing from the spirit and scope thereof as recited in the appended claims.

We claim:

1. A new use for a statistically balanced incomplete block design (BIBD) and other uniform distributions (Latin Squares, Hadamard Matrices) of redundancy groups across a storage subsystem formed from a subsystem controller responsive to access requests from a CPU and attaching an array of control units coupling said controller and attached strings of direct access storage devices (DASD's), and means for ascertaining DASD unavailability, said new use for minimizing array access loading per DASD when operating in failure mode, each redundancy group comprising a predetermined number of data blocks and a predetermined number of redundancy blocks computed over the data blocks, said storage subsystem being either of the RAID 4 or the RAID 5 DASD array type, said array controller comprising the steps of:

(a) forming and writing redundancy groups of data and redundancy blocks onto the array DASD's over a path through the controller and ones of the control units according to a block design selected from the set consisting of a balanced incomplete block design, Latin Squares, and Hadamard Matrices, said block design constituting a predetermined pattern according to which the redundancy groups are written and stored on the DASDs of the arrays and which ensure that any additional accessing occasioned by the unavailability of a DASD would be uniformly distributed among the remaining DASDs in the array; and (b) responsive to any unavailability of a path to array data occasioned by a failed control unit or DASD provided by said ascertaining means, accessing remaining DASD's in the array by said controller in a minimal referencing pattern as a function of the redundancy group distribution written onto the array DASDs according to the block design selected in step (a).

2. In a storage subsystem having a controller responsive to access requests from a CPU, C control units attaching the controller and a counterpart string of S direct access storage devices (DASD's) in a C*S array, and means for ascertaining DASD unavailability, a method for accessing said C*S array for minimizing array access loading per DASD when operating in failure mode, a plurality of N parity groups of data blocks being defined onto the DASD's, each parity group including K-1 data areas + an area containing a parity measure, said parity measure being a coded area formed by the exclusive OR of the K-1 data areas, said method comprising the steps of:

(a) forming and writing of a uniform distribution of N parity groups by said controller such that each DASD is partitioned into N equal sized regions or recording areas and assigned regions to the parity groups wherein (1) any two regions in the same parity group are located on different DASD's, (2) each DASD has one region assigned to each one of N different parity groups, and (3) for every pair of DASD's, there are exactly M parity groups containing regions from both DASD's; and (b) responsive to any unavailability of a path to addressable information on a failed DASD as provided by said ascertaining means, accessing any of (C*S)-1 DASD's other than the failed DASD in a minimal referencing pattern by said controller as a function of the uniformity of the distribution of parity groups written onto the DASD's according to the constraints of step (a).

3. The method according to claim 2, wherein said distribution being selected during step (a) from a set consisting of a balanced incomplete block design (BIBD), Latin Squares, and Hadamard matrices, BIBD, Latin Squares, and Hadamard matrices being patterns of writing out and storing the data and parity areas of the parity groups which minimize any unbalance in any additional accessing of DASDs in the array occasioned by the unavailability of any single DASD in said array.

4. In a storage subsystem having a controller responsive to access requests from a CPU, C control units attaching the controller and a counterpart string of S direct access storage devices (DASD's) in a C*S array, means for ascertaining DASD unavailability, and means for executing externally supplied read R and write W requests, a method for balancing any distribution of said requests to the C*S array, a parity measure (XOR) being defined over information located on counterpart physical recording areas of $K < C*S$ DADS's, a parity group of K recording areas comprising K-1 data areas + the parity measure, said parity measure being a coded area formed by the exclusive OR of the K-1 data areas, information in any given parity group located on an unavailable DASD being reconstructed by logically combining (XORing) information retrieved from the K other DASD's, comprising the steps of:

(a) forming and writing parity groups of K areas/group by said controller uniformly over the counterpart DASDs in the array, said parity groups being distributed according to a predetermined pattern formed from a combinatorial block design selected from the set consisting of a balanced incomplete block design, Latin Squares, and Hadamard Matrices, accessing parity groups distributed according to the pattern being operative to minimize any unbalance in any additional accessing of DASDs in the array occasioned by the availability of any single DASD in said array; and (b) responsive to the unavailability of a path to addressable information on a failed DASD, accessing the remaining (C*S)-1 other DASD in a minimal referencing pattern by said controller as a function of the uniformity of the distribution of parity groups.

5. The method according to claim 4, wherein step (a) further comprises the step of allocating the parity groups on the DASD's by said controller such that: (1) a given parity group only appears once in any string, and (2) parity groups be placed on the DASDs such that accesses to a failed DASD on a first string result in uniformly distributed accesses to the (S*(C-1)) DASDs other than the failed DASD on (C-1) strings other than the string containing the failed DASD.

6. The method according to claim 4 wherein the number of data areas of at least two of the parity groups as recited in step (a) are incommensurable.

7. The method according to any one of claims 1 and 4, wherein at least one of the DASD in the array includes recording space not dedicated to a parity group, said recording space being of size sufficient to accommodate at least a part of a parity group recorded in a sparing mode.

8. In a storage subsystem having C controllers each attaching a counterpart string of S direct access storage devices (DASD's) in a C*S array, and means for accessing the C*S array and for attaching said array to a computing system, a plurality of N parity groups of data blocks being defined onto the DASD's, each parity group including K-1 data areas+an area containing a parity measure, said parity measure being a coded area formed by the exclusive OR of the K-1 data areas, wherein:

(a) said accessing means includes means for forming and writing of a uniform distribution of N parity groups such that each DADS is partitioned into N equal sized regions or recording areas and assigned regions to the parity groups wherein (1) any two regions in the same parity group are located on different DADS's, (2) each DASD has one region assigned to each one of N different parity groups, and (3) for every pair of DASD's, there are exactly M parity groups containing regions from both DASD's; and (b) said accessing means includes means responsive to any unavailability of a path to addressable information on a failed DASD for accessing any of (C*S)-1 DASD's other than the failed DASD in a minimal referencing pattern as a function of the uniformity of the distribution of parity groups written onto the DASD's according to the constraints of the forming and writing means.

* * * * *